United States Patent [19]

Sumiyoshi et al.

[11] Patent Number: 5,405,200
[45] Date of Patent: Apr. 11, 1995

[54] SPHERICAL BEARING AND METHOD OF PRODUCTION THEREOF

[75] Inventors: Kikuo Sumiyoshi, Fujisawa; Kouichi Tsunoda, Yamato, both of Japan

[73] Assignee: Oiles Corporation, Tokyo, Japan

[21] Appl. No.: 77,451

[22] Filed: Jun. 17, 1993

[30] Foreign Application Priority Data

Jun. 18, 1992 [JP] Japan .................................. 4-186212

[51] Int. Cl.$^6$ .............................................. F16C 23/04
[52] U.S. Cl. ..................................... 384/208; 384/213
[58] Field of Search ............... 384/206, 208, 213, 207, 384/214

[56] References Cited

U.S. PATENT DOCUMENTS

| | | | |
|---|---|---|---|
| 3,736,635 | 6/1973 | Romer et al. | 29/149.5 B |
| 4,846,590 | 7/1989 | Teramachi | 384/208 |
| 5,265,965 | 11/1993 | Harris et al. | 384/206 |

FOREIGN PATENT DOCUMENTS 47-14694 5/1972 Japan .
51-42569 11/1976 Japan .

*Primary Examiner*—Lenard A. Footland
*Attorney, Agent, or Firm*—Nixon & Vanderhye

[57] ABSTRACT

A spherical bearing includes an outer ring formed integrally with a rod end, an inner ring having a spherical outer peripheral surface arranged in face-to-face relation with the inner peripheral surface of the outer ring, and a flexible lubricating sheet disposed between the inner peripheral surface of the outer ring and the spherical outer peripheral surface of the inner ring. Respective central portions in both annular areas of the flexible lubricating sheet which are respectively defined between an axial center of the outer ring and one annular end of the inner peripheral surface of the outer ring and between the axial center of the outer ring and another annular end of the inner peripheral surface of the outer ring are made to undergo plastic flow and are formed to be thinner than a remaining portion of the flexible lubricating sheet.

11 Claims, 5 Drawing Sheets

SPHERICAL BEARING AND METHOD OF PRODUCTION THEREOF

BACKGROUND OF THE INVENTION

The present invention relates to a spherical bearing capable of being used as a rod end spherical bearing or the like and a method of production thereof.

DESCRIPTION OF THE RELATED ART

Rod end spherical bearings, in which an inner ring is fitted in an outer ring disposed on a rod end, are disclosed in, for instance, Japanese Patent Publication Nos. 14694/1972 and 42569/1976 and U.S. Pat. No. 3736635.

In the rod end spherical bearing disclosed in FIG. 1 of Japanese Patent Publication No. 14694/1972, after a cylindrical hole is bored in a head, an inner ring whose outer periphery is formed in a spherical shape is inserted into this portion, and both side faces of the head are subjected to pressure forming so as to prevent the inner ring from coming off. This rod end spherical bearing has a gap in the axial center of the outer ring, and if foreign objects enter this gap, corrosion, biting, or the like can result, thereby possibly hampering smooth rotation of the inner ring relative to the outer ring. In addition, in the rod end spherical bearing disclosed in this publication, since both side faces of the head are brought into direct contact with the inner ring by pressure forming, the relative rotation cannot be effected very smoothly. If the contact due to pressure forming is too strong, the smooth rotation of the inner ring relative to the outer ring becomes difficult. If, conversely, the contact is too weak and a small gap is present, play occurs between the inner ring and the outer ring, which also makes it impossible to obtain the smooth rotation of the inner ring relative to the outer ring. Accordingly, unless pressure forming is effected extremely precisely, it is difficult to obtain a rod end spherical bearing exhibiting a desired characteristic of smooth rotation.

In the spherical bearing disclosed in Japanese Patent Publication No. 42569/1976, a self-lubricating thin plate is interposed between the inner ring and the outer ring. In this spherical bearing, however, there is a possibility of the self-lubricating thin plate coming off between the inner ring and the outer ring over long periods of use, so that there is a problem in its durability. The spherical bearing disclosed in U.S. Pat. No. 3736635 has a problem similar to that of the spherical bearing disclosed in Japanese Patent Publication No. 42569/1976.

SUMMARY OF THE INVENTION

The present invention has been devised in view of the above-described problems, and an object of the present invention is to provide a spherical bearing which is practically free of the occurrence of play, in which the rotation of the inner ring relative to the outer ring is very smooth, and which excels in durability, as well as a manufacturing method which makes it possible to easily manufacture such spherical bearings.

To this end, in accordance with one aspect of the present invention, there is provided a spherical bearing comprising: an outer ring; an inner ring having a spherical outer peripheral surface arranged in face-to-face relation with an inner peripheral surface of the outer ring; and a flexible lubricating sheet disposed between the inner peripheral surface of the outer ring and the spherical outer peripheral surface of the inner ring, the flexible lubricating sheet having a metallic net-like member as a base material, a synthetic resin composition exhibiting lubricity being filled in meshes of the base material and coated on a surface of the base material, respective portions of the flexible lubricating sheet which are offset from central portions of respective annular areas in an axial direction of the outer ring toward respective annular ends of the inner peripheral surface of the outer ring, or respective substantially central portions of the respective annular areas in the axial direction, being made to undergo plastic flow and formed to be thinner than a remaining portion of the flexible lubricating sheet, the annular areas of the flexible lubricating sheet being respectively defined between a center of the outer ring in the axial direction and one annular end of the inner peripheral surface of the outer ring and between the center of the outer ring in the axial direction and the other annular end of the inner peripheral surface of the outer ring.

In accordance with another aspect of the present invention, there is provided a spherical bearing comprising: an outer ring; an inner ring having a spherical outer peripheral surface arranged in face-to-face relation with an inner peripheral surface of the outer ring; and a flexible lubricating sheet disposed between the inner peripheral surface of the outer ring and the spherical outer peripheral surface of the inner ring, the flexible lubricating sheet having an expanded metal as a base material, a synthetic resin composition exhibiting lubricity being filled in meshes of the base material and coated on a surface of the base material, the expanded metal of the flexible lubricating sheet partially biting into the inner peripheral surface of the outer ring.

In accordance with still another aspect of the present invention, there is provided a method of manufacturing a spherical bearing, comprising the steps of: preparing a spherical bearing element assembly including an outer ring having a cylindrical inner peripheral surface, an inner ring having a spherical outer peripheral surface arranged in face-to-face relation with the inner peripheral surface of the outer ring, and a flexible lubricating sheet of a hollow cylindrical shape disposed between the inner peripheral surface of the outer ring and the spherical outer peripheral surface of the inner ring and having a metallic net-like member as a base material, a synthetic resin composition exhibiting lubricity being filled in meshes of the base material and coated on a surface of the base material; and a pair of caulking dies respectively provided with annular projections with a substantially triangular cross section on the surfaces thereof; placing the spherical bearing element assembly on one of the caulking dies in such a manner that the annular projection of that caulking die abuts against the outer ring on an outer side of one annular end of the inner peripheral surface of the outer ring; placing other of the caulking dies on the spherical bearing element assembly in such a manner that the annular projection of that caulking die abuts against the outer ring on an outer side of the other annular end of the inner peripheral surface of the outer ring; and pressing the one of the caulking dies toward the other of the caulking dies so as to form annular recesses of configurations corresponding to those of the annular projections on the respective outer sides of both the annular ends of the inner peripheral surface of the outer ring and deform outer sides of both the annular ends of the inner peripheral surface of the outer ring toward the center of the spherical bearing element assembly, such that respective portions of the flexible lubricating sheet which are offset from central portions of respective annular areas in an axial direction of the outer ring toward respective annular ends of the inner peripheral surface of the outer ring, or respective substantially central portions of the respective annular areas in the axial direction, are made to undergo plastic flow, the annular areas of the flexible lubricating sheet being respectively defined between a center of the outer ring in the axial direction and one annular end of the inner peripheral surface of the outer ring and between the center of the outer ring in the axial direction and the other annular end of the inner peripheral surface of the outer ring.

As the base material of the flexible lubricating sheet, it is possible to cite an expanded metal having regular meshes or a metallic mesh member formed by weaving fine metal wires longitudinally and transversely or by knitting the fine metal wires, or other similar material may be used. As the synthetic resin composition exhibiting lubricity, it is preferable to use a fluoroplastic, or a synthetic resin composition having polytetrafluoroethylene as its main component, or it is possible to use a synthetic resin composition in which a known solid lubricant, a reinforcing agent, an antistatic agent, and the like are compounded in a fluoroplastic.

In the manufacturing method in accordance with the present invention, at the time of pressing one of the caulking dies toward the other of the caulking dies, the spherical bearing element assembly including the flexible lubricating sheet having as the base material an expanded metal having a hardness equivalent to or greater than that of the outer ring is preferably prepared so as to allow the net-like member of the flexible lubricating sheet to partially bite into the inner peripheral surface of the outer ring. As preferred examples of the material of such an outer ring, it is possible to cite steel, copper, a copper alloy, aluminum, an aluminum alloy, zinc, a zinc alloy, a magnesium alloy, nickel, a nickel alloy, and the like, but other materials may be used. In particular, a steel, such as a hot rolled steel plate or sheet for automobile structural purposes (JIS G 3113 SAPH) or a hot-rolled mild steel plate or sheet (JIS G 3131 SPHC corresponding to ASTM A569/A569M-85, ASTM A621/A621M-82, and ASTM A622/A622M-82), is preferable. Meanwhile, as preferred examples of the material of the expanded metal, it is possible to cite a stainless steel strip for spring (JIS G 4313 SUS304-CSP corresponding to ASTM A167-88 TYPE 304), a phosphor bronze plate, sheet, or strip for spring (JIS H 3130 C5210 corresponding to ASTM B103-88 UNS No. C52100), titanium, a titanium alloy, and the like. It goes without saying that other materials such as phosphor bronze plates, sheets, or strip (JIS H 3110 C5111, C5102, C5191, and C5212 which correspond to ASTM B103-88) may be used. If the base material of the flexible lubricating sheet is preferably formed of an expanded metal having a hardness equivalent to or greater than that of the outer ring, so as to allow portions of the expanded metal to reliably bite into the inner peripheral surface of the outer ring. Since the surface of the expanded metal which abuts against the inner peripheral surface of the outer ring is configured in the form of wedges, it is considered that the portions of the expanded metal bite into the outer ring thanks to the wedge effect.

In accordance with the spherical bearing of the present invention, the flexible lubricating sheet is disposed between the inner peripheral surface of the outer ring and the spherical outer peripheral surface of the inner ring. Respective portions of the flexible lubricating sheet which are offset from central portions of respective annular areas in the axial direction of the outer ring toward respective annular ends of the inner peripheral surface of the outer ring, or respective substantially central portions of the respective annular areas in the axial direction, are made to undergo plastic flow and are formed to be thinner than the remaining portion of the flexible lubricating sheet, the annular areas of the flexible lubricating sheet being respectively defined between the center of the outer ring in the axial direction thereof and the one annular end of the inner peripheral surface of the outer ring and between the center of the outer ring in the axial direction thereof and the other annular end of the inner peripheral surface of the outer ring. As such, in the spherical bearing of the present invention, the occurrence of play is prevented by the flexible lubricating sheet, and very smooth rotation of the inner ring with respect to the outer ring can be ensured. Furthermore, since the respective portions of the flexible lubricating sheet which are offset from the central portions of the respective annular areas in the axial direction of the outer ring toward respective annular ends of the inner peripheral surface of the outer ring, or respective substantially central portions of the respective annular areas in the axial direction, are made to undergo plastic flow and are formed to be thinner than the remaining portion of the flexible lubricating sheet, it is possible to prevent the entrance of foreign objects into portions surrounding the center of the inner peripheral surface of the outer ring in the axial direction, and it is possible to reliably prevent the flexible lubricating sheet from coming off between the inner ring and the outer ring.

In addition, in the spherical bearing of the present invention in which the expanded metal of the flexible lubricating sheet partially bites into the inner peripheral surface of the outer ring, it is possible to reliably prevent the flexible lubricating sheet from coming off between the inner ring and the outer ring, and to reliably prevent the relative rotation of the flexible lubricating sheet itself with respect to the outer ring while in use.

In accordance with the present invention, since the flexible lubricating sheet is disposed between the inner peripheral surface of the outer ring and the spherical outer peripheral surface of the inner ring, it is possible to prevent the occurrence of play which is liable to occur between the inner peripheral of the outer ring and the spherical outer peripheral surface of the inner ring, and the rotation of the inner ring relative to the outer ring can be effected very smoothly. In addition, since the respective portions of the flexible lubricating sheet which are offset from the central portions of the respective annular areas in the axial direction of the outer ring toward respective annular ends of the inner peripheral surface of the outer ring, or respective substantially central portions of the respective annular areas in the axial direction, are made to undergo plastic flow and are formed to be thinner than the remaining portion of the flexible lubricating sheet, it is possible to reliably prevent foreign objects such as water and dust from entering the portions surrounding the center of the inner peripheral surface of the outer ring in the axial direction. At the same time, over long periods of use it is possible to reliably prevent the flexible lubricating sheet from coming off between the inner ring and the outer ring, so that the durability is made excellent, and it is possible to allow the inner ring to rotate very smoothly relative to the outer ring.

Furthermore, in the spherical bearing in which the net-like member of the flexible lubricating sheet partially bites into the inner peripheral surface of the outer ring, it is possible to reliably prevent the flexible lubricating sheet from coming off between the inner ring and the outer ring, and to reliably prevent the relative rotation of the flexible lubricating sheet itself with respect to the outer ring while in use. Moreover, in accordance with the present invention, it is possible to provide a manufacturing method which is capable of easily manufacturing the spherical bearing having excellent characteristics, as described above.

Hereafter, a more detailed description of the present invention will be given on the basis of specific examples shown in the drawings. Hence, the above-described invention and other aspects of the invention will become more apparent. It should be noted that the present invention is not restricted to these specific examples.

DESCRIPTION OF THE PREFERRED EMBODIMENTS

Figure 1:
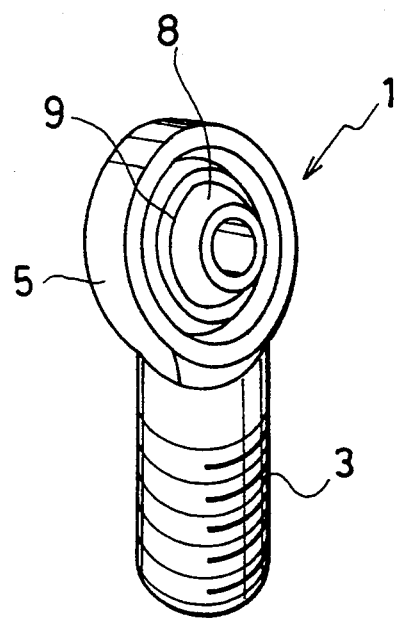
FIG. 1 is a perspective view of a preferred embodiment of a spherical bearing in accordance with the present invention.
Figure 2:
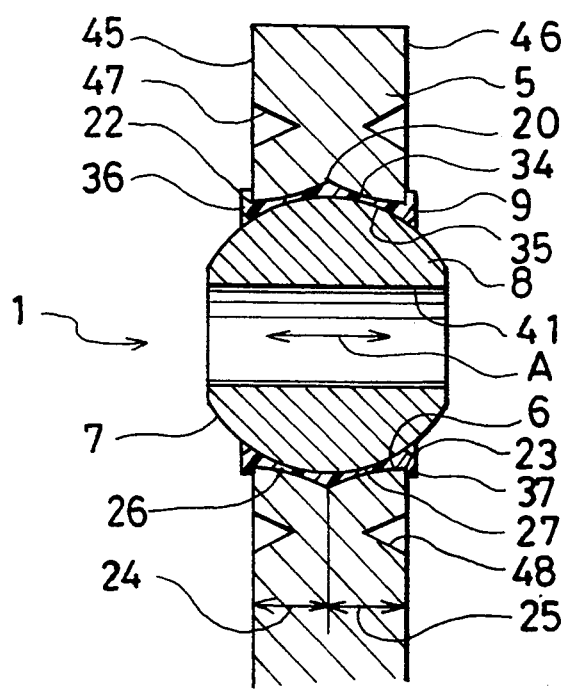
FIG. 2 is a detailed cross-sectional view of the embodiment shown in FIG. 1.

In FIGS. 1 and 2, a spherical bearing 1 of this embodiment is disposed integrally on a rod end 3, and is formed as a rod end spherical bearing. The spherical bearing 1 is formed of a hot rolled steel plate or sheet for automobile structural purposes (SAPH400) formed integrally with the rod end 3, and comprises an outer ring 5 with a Vickers hardness of HV180, an inner ring 8 having a spherical outer peripheral surface 7 arranged in face-to-face relation with an inner peripheral surface 6 of the outer ring 6, and a flexible lubricating sheet 9 disposed between the inner peripheral surface 6 of the outer ring 5 and the spherical outer peripheral surface 7 of the inner ring 8. As shown in detail in FIG. 2, the flexible lubricating sheet 9 is made to undergo plastic flow at substantially central portions 26 and 27 of both annular areas 24 and 25 which are respectively defined between a center 20, as viewed in the axial direction of the outer ring 5, i.e., in the direction of A, of the outer ring 5 and one annular end 22 of the inner peripheral surface 6 of the outer ring 5, and between the center 20 of the outer ring 5 and the other annular end 23 of the inner peripheral surface 6 of the outer ring 5. Hence, these substantially central portions 26 and 27 are formed to be thinner than the remaining portion of the flexible lubricating sheet 9.

Figure 6:
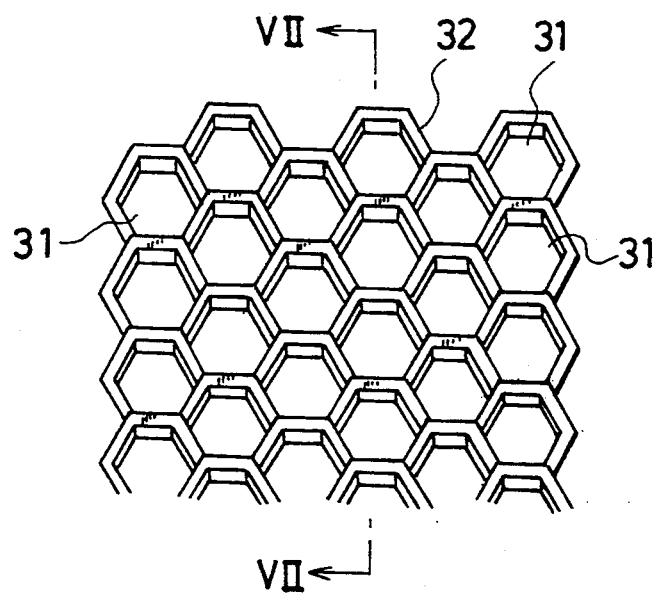
FIG. 6 is a detailed explanatory diagram of a flexible lubricating sheet shown in FIG. 1.
Figure 7:
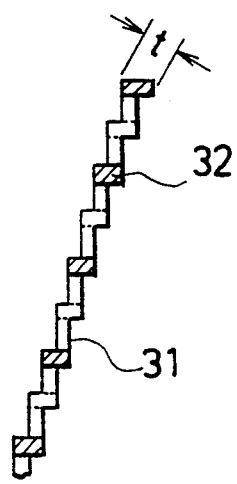
FIG. 7 is a cross-sectional view, taken along line VII—VII, of the flexible lubricating sheet shown in FIG. 6.
Figure 8:
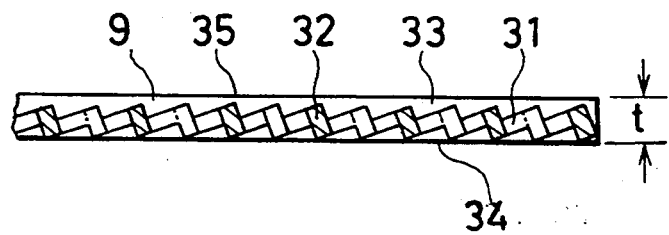
FIG. 8 is an enlarged cross-sectional view of the flexible lubricating sheet shown in FIG. 1.

In this example, as shown in FIGS. 6 to 8, the flexible lubricating sheet 9 is arranged as follows: An expanded metal 32 (having a thickness t=0.5 mm, for instance) which is formed of phosphor bronze for spring (C5210 corresponding to ASTM B103-88 UNS No. C52100) with a Vickers hardness of HV195 and having regular meshes 31 as a net-like member is used as a base material. As a synthetic resin composition exhibiting lubricity, a synthetic resin composition 33 which has polytetrafluoroethylene as its main component and in which polyimide resin is filled is filled in the meshes 31 and coated on the surface of the expanded metal 32.

Portions (wedge-like portions) of the expanded metal 32 of the flexible lubricating sheet 9 bite into the inner peripheral surface 6 of the outer ring 5. As a result, an outer peripheral surface 34 of the flexible lubricating sheet 9 is secured to the inner peripheral surface 6 of the outer ring 5, so that the flexible lubricating sheet 9 is prevented from rotating with the inner ring 8 relative to the outer ring 5. Meanwhile, the spherical outer peripheral surface 7 of the inner ring 8 slidably abuts against an inner peripheral surface 35 of the flexible lubricating sheet 9. In addition, both annular ends 36 and 37 of the flexible lubricating sheet 9 are also made to undergo plastic flow and are formed in the shape of collars, respectively, covering the annular ends 22 and 23 of the outer ring 5.

A through hole 41 is formed in the inner ring 8, and a mating member to be coupled via this spherical bearing 1 is fitted and secured in the through hole 41. It should be noted that annular recesses 47 and 48 each having a triangular cross section are formed on the outer sides of the annular ends 22 and 23 in such a manner as to surround the annular ends 22 and 23, and the annular recesses 47 and 48 are formed during the manufacture of the spherical bearing 1, which will be described later.

In the spherical bearing 1 constructed as described above, since the flexible lubricating sheet 9 is disposed between the inner peripheral surface 6 of the outer ring 5 and the spherical outer peripheral surface 7 of the inner ring 8, it is possible to prevent the occurrence of play, which is otherwise liable to occur between the inner peripheral surface 6 of the outer ring 5 and the spherical outer peripheral surface 7 of the inner ring 8. In addition, it is possible to ensure very smooth rotation of the inner ring 8 relative to the outer ring 5 over extended periods of time. Furthermore, since the substantially central portions 26 and 27 of both annular areas 24 and 25 of the flexible lubricating sheet 9 are made to undergo plastic flow and are formed to be thinner than the remaining portion, it is possible to reliably prevent foreign objects from entering portions surrounding the center 20 of the inner peripheral surface 6 of the outer ring 5. In addition, over long periods of use it is possible to reliably prevent the flexible lubricating sheet 9 from coming off between the inner ring 8 and the outer ring 5, so that the durability becomes excellent.

Figure 3:
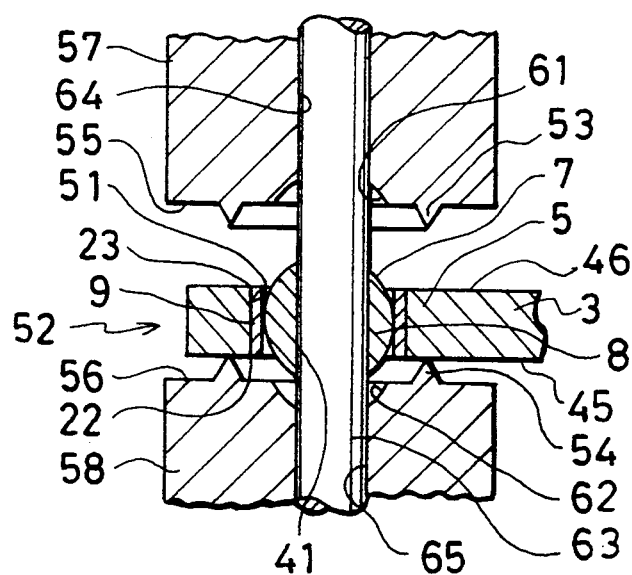
FIG. 3 is a diagram of a preferred specific example of the method of manufacturing a spherical bearing in accordance with the present invention.
Figure 4:
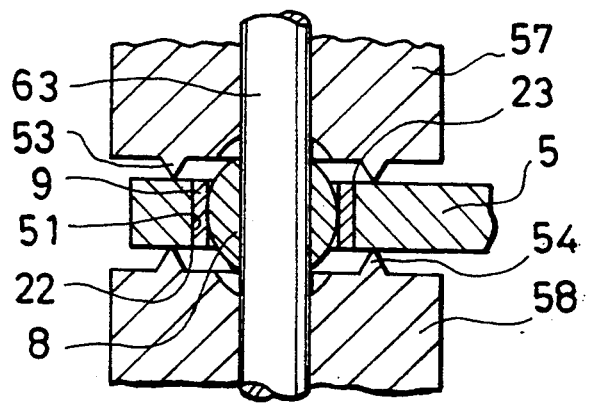
FIG. 4 is a diagram of the preferred specific example of the method of manufacturing a spherical bearing in accordance with the present invention.
Figure 5:
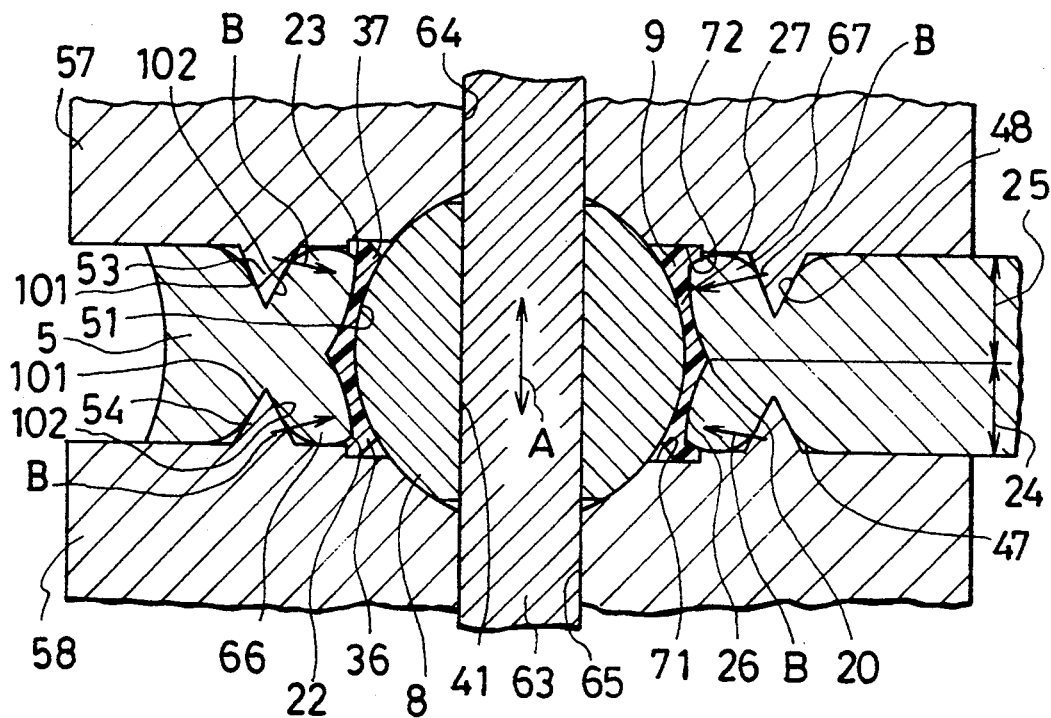
FIG. 5 is a diagram of the preferred specific example of the method of manufacturing a spherical bearing in accordance with the present invention.

Referring now to FIGS. 3 to 5, a description will be given of a method of manufacturing the spherical bearing 1 described above. First, as shown in FIG. 3, the following are prepared: a spherical bearing element assembly 52 comprising the outer ring 5 having a cylindrical inner peripheral surface 51, the inner ring 8 having the spherical outer peripheral surface 7 arranged in face-to-face relation with the inner peripheral surface 51 of the outer ring 5, and the flexible lubricating sheet 9 formed in the shape of a hollow cylinder and disposed between the inner peripheral surface 51 of the outer ring 5 and the spherical outer peripheral surface 7 of the inner ring 8, as well as a pair of caulking dies 57 and 58 which are respectively provided with annular projections 53 and 54 with a substantially triangular cross section on the surfaces 55 and 56 thereof. It should be noted that recesses 61 and 62 corresponding to the configuration of the inner ring 8 and through holes 64 and 65 for allowing a positioning rod 63 to pass therethrough are respectively formed in the dies 57 and 58.

As also shown in FIG. 3, the spherical bearing element assembly 52 is placed on one caulking die 58 serving as a lower die in such a manner that the annular projection 54 of the caulking die 58 abuts against the side face 45 of the outer ring 5 on the outer side of one annular end 22 of the inner peripheral surface 51. Meanwhile, the other caulking die 57 serving as an upper die is placed on the spherical bearing element assembly 52 in such a manner that the annular projection 53 of the caulking die 57 abuts against the side face 46 of the outer ring 5 on the outer side of the other annular end 23 of the inner peripheral surface 51. Then, the positioning rod 63 is inserted through the through holes 41, 64, and 65.

Next, as shown in FIG. 4, the caulking die 57 is lowered and pressed toward the caulking die 58. As the caulking die 57 is thus lowered, as shown in FIG. 5, the annular recesses 47 and 48 of the configurations corresponding to those of the annular projections 54 and 53 are formed on the respective outer sides of both annular ends 22 and 23 of the inner peripheral surface 51 of the outer ring 5, and surrounding portions 66 and 67 of both annular ends 22 and 23 of the inner peripheral surface 51 of the outer ring 5 are deformed toward the center of the spherical bearing element assembly, i.e., in the direction of B. As a result, in the flexible lubricating sheet 9, plastic flow takes place at the substantially central portions 26 and 27 of both annular areas 24 and 25 which are respectively defined between the center 20, as viewed in the direction of A, of the outer ring 5 and the annular end 22 of the inner peripheral surface 51 (corresponding to the inner peripheral surface 6 shown in FIG. 2) of the outer ring 5, and between the center 20, as viewed in the direction of A, of the outer ring 5 and the annular end 23 of the inner peripheral surface 51 of the outer ring 5. Thus, as plastic flow is caused to take place at the substantially central portions 26 and 27 in the flexible lubricating sheet 9, the substantially central portions 26 and 27 are formed to be thinner than the remaining portion. Subsequently, the caulking die 57 is raised, and the positioning rod 63 is drawn out from the through holes 41, 64, and 65. Finally, stresses are removed by tapping the outer ring 5 and the inner ring 8 or running them in, thereby making it possible to obtain the above-described spherical bearing 1.

In accordance with the above-described manufacturing method, even if the pressing force with respect to the caulking die 57 is not adjusted with high precision, the spherical bearing 1 having the above-described characteristics can be manufactured easily, and the spherical bearing 1 of uniform quality can be provided at low cost.

It should be noted that, as shown in FIG. 5, annular notches 71 and 72 may be respectively formed on the caulking dies 57 and 58 so that the collar portions can be positively formed at both annular ends 36 and 37 of the flexible lubricating sheet 9 through plastic flow. In addition, the angles of inclination of opposing, inclined surfaces 101 and 102 of the annular projections 53 and 54 of the triangular section should preferably be the same in the light of durability, but are not necessarily restricted to the same.

Figure 9:
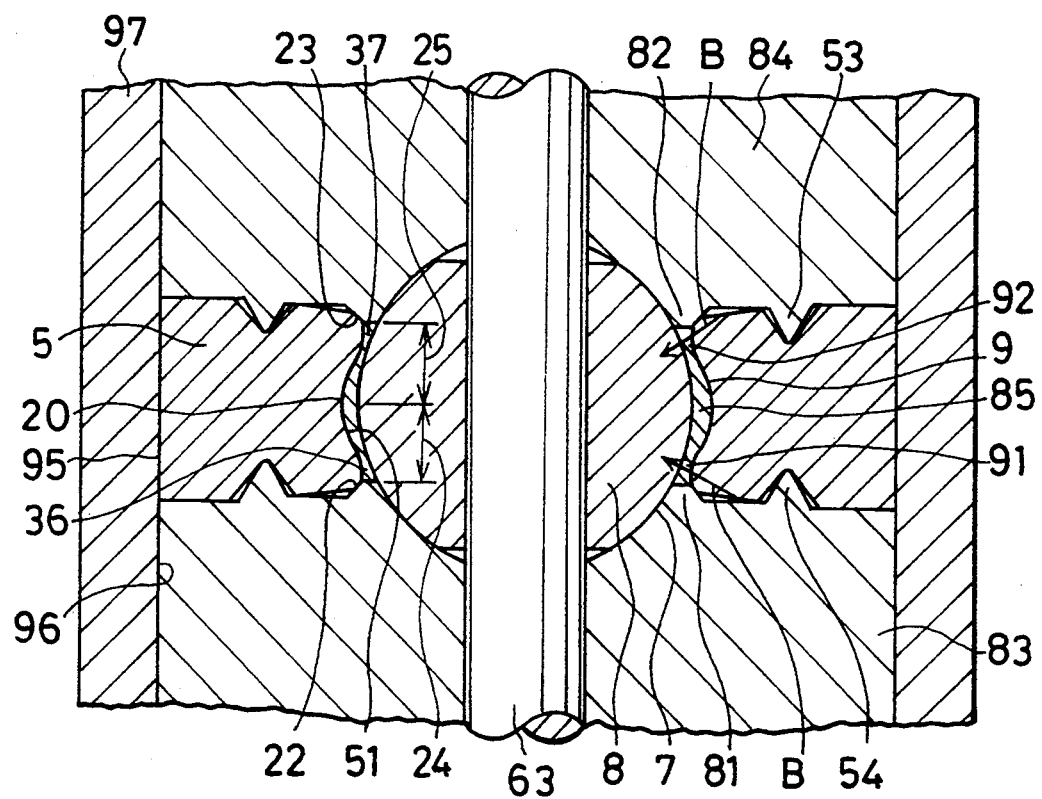
FIG. 9 is a diagram of another preferred specific example of the method of manufacturing a spherical bearing in accordance with the present invention.

Instead of the annular notches 71 and 72 formed on the caulking die 57 and the caulking die 58, annular projections 81 and 82 may be provided at the same positions to form caulking dies 83 and 84, as shown in FIG. 9, and the above-described manufacturing method may be implemented by using the caulking dies 83 and 84. If the caulking dies 83 and 84 are used, an annular clearance 85 which is formed between the inner peripheral surface 51 and the spherical outer peripheral surface 7 and in which the flexible lubricating sheet 9 is disposed is closed by the annular projections 81 and 82 at its opposite ends. As a result, both annular ends 36 and 37 of the flexible lubricating sheet 9 are prevented from flowing to the outside from the opposite ends of the annular clearance 85, and the flexible lubricating sheet 9 is allowed to plastically flow mainly toward the center 20. Consequently, the flexible lubricating sheet 9 is reliably disposed in the annular clearance 85 in the vicinity of the center 20 without producing a gap. In addition, By virtue of the caulking dies 83 and 84, since both annular ends 22 and 23 of the outer ring 5 are pressed in the direction of B by the annular projections 81 and 82, the deformation in the direction of B of the outer ring 5 in the vicinities of both annular ends 22 and 23 is further promoted. As a result, portions 91 and 92 of the flexible lubricating sheet 9 which are slightly offset toward both annular ends 22 and 23, respectively, of the inner peripheral surface 51 of the outer ring 5 from the axially central portion in both annular areas 24 and 25 are made to undergo plastic flow and are formed to be thinner than the remaining portion of the flexible lubricating sheet 9. If the flexible lubricating sheet 9 is thus formed to be thinner at the slightly offset portions 91 and 92, the inner ring 8 can be supported more smoothly, and it is possible to obtain desirable operation as the spherical bearing.

In addition, as shown in FIG. 9, a die 97 of a hollow cylindrical shape for restricting the outer configuration, in which an inner peripheral surface 96 thereof is fitted closely to an outer peripheral surface 95 of the outer ring 5, may be prepared, and the caulking die 84 may be pressed and lowered toward the caulking die 83 inside the die 97. If the outer peripheral surface 95 of the outer ring 5 is thus restricted by the die 97, it is possible to prevent the deformation of the outer peripheral surface 95 of the outer ring 5 due to the pressing of the outer ring 5 by the caulking dies 83 and 84, thereby making it possible to favorably prevent the occurrence of cracks or breakage of the outer peripheral surface 95 of the outer ring 5.

What is claimed is:
1. A spherical bearing comprising:
   an outer ring formed of steel having an axis and an inner peripheral surface;

an inner ring having a spherical outer peripheral surface arranged in face-to-face relation with said inner peripheral surface of said outer ring; and a flexible lubricating sheet disposed between the inner peripheral surface of said outer ring and the spherical outer peripheral surface of said inner ring, said flexible lubricating sheet having an expanded metal sheet forming a mesh as a base material, and a synthetic resin composition exhibiting lubricity filling said mesh of said expanded metal sheet and coated on a surface of said expanded metal sheet mesh, said expanded metal sheet having wedge-like portions, respective axially spaced portions of annular areas of said flexible lubricating sheet on axially opposite sides of a plane through the center of said outer ring normal to said axis being having undergone plastic flow as a result of a caulking operation on the outer ring and formed to be thinner than remaining portions of said flexible lubricating sheet on opposite sides of said central portions, said wedge-like portions of the expanded metal sheet biting into the inner peripheral surface of the outer ring as the result of the caulking operation on the outer ring.

2. A spherical bearing according to claim 1, wherein the expanded metal has a regular mesh pattern.

3. A spherical bearing according to claim 1, wherein said synthetic resin composition exhibiting lubricity comprises a fluoroplastic.

4. A spherical bearing according to claim 1, wherein the synthetic resin composition exhibiting lubricity is constituted by a synthetic resin composition which has polytetrafluoroethylene as its main component.

5. A spherical bearing comprising:
an outer ring formed of steel having an axis and an inner peripheral surface;
an inner ring having a spherical outer peripheral surface arranged in face-to-face relation with said inner peripheral surface of said outer ring; and
a flexible lubricating sheet disposed between the inner peripheral surface of said outer ring and the spherical outer peripheral surface of said inner ring, said flexible lubricating sheet having an expanded metal sheet forming a mesh as a base material, and a synthetic resin composition exhibiting lubricity filling said mesh of said expanded metal sheet and coated on a surface of said expanded metal sheet, said expanded metal sheet having wedge-like portions, substantially central portions in an axial direction in respective annular areas of said flexible lubricating sheet which are respectively defined between a center of said outer ring in the axial direction and one annular end of the inner peripheral surface of said outer ring and between the center of said outer ring in the axial direction and other annular end of the inner peripheral surface of said outer ring having undergone plastic flow as a result of a caulking operation on the outer ring and formed to be thinner than remaining portions of said flexible lubricating sheet on opposite sides of said central portion, said wedge-like portions of the expanded metal sheet biting into the inner surface of the outer ring as the result of caulking operation on the outer ring.

6. A spherical bearing according to claim 5, wherein the expanded metal sheet has a regular mesh pattern.

7. A spherical bearing according to claim 5, wherein the synthetic resin composition exhibiting lubricity comprises a fluoroplastic.

8. A spherical bearing according to claim 5, wherein the synthetic resin composition exhibiting lubricity is constituted by a synthetic resin composition which has polytetrafluoroethylene as its main component.

9. A spherical bearing comprising:
an outer ring formed of steel;
an inner ring having a spherical outer peripheral surface arranged in face-to-face relation with an inner peripheral surface of said outer ring; and
a flexible lubricating sheet disposed between the inner peripheral surface of said outer ring and the spherical outer peripheral surface of said inner ring, said flexible lubricating sheet having an expanded metal sheet forming a mesh as a base material and a synthetic resin composition exhibiting lubricity filling said mesh of said expanded metal sheet and coated on a surface of said expanded metal sheet, the expanded metal sheet having wedge-like portions, the expanded metal sheet partially biting into the inner peripheral surface of said outer ring at the wedge-like portions thereof as a result of a caulking operation on the outer ring.

10. A spherical bearing according to claim 9, wherein the synthetic resin composition exhibiting lubricity comprises a fluoroplastic.

11. A spherical bearing according to claim 9, wherein the synthetic resin composition exhibiting lubricity is constituted by a synthetic resin composition which has polytetrafluoroethylene as its main component.

* * * * *